United States Patent [19]

Doin et al.

[11] 3,882,673
[45] May 13, 1975

[54] METHOD OF USING LIQUID OXIDANTS TO OBTAIN PURIFIED GASES FROM SOLID PROPELLANTS

[75] Inventors: Bernard Doin; Bernard Plantif, both of Saint-Medard-en-Jalles, France

[73] Assignee: Societe Nationale des Poudres et Explosifs, Paris, France

[22] Filed: Dec. 6, 1971

[21] Appl. No.: 205,046

[30] Foreign Application Priority Data
Dec. 11, 1970 France .......................... 70.44838

[52] U.S. Cl. ............... 60/207; 60/219; 280/150 AB
[51] Int. Cl. ............... C06d 5/06; C06d 5/08; B60n
[58] Field of Search ............... 60/205, 219, 207; 280/150 AB

[56] References Cited
UNITED STATES PATENTS
| | | | |
|---|---|---|---|
| 3,532,359 | 10/1970 | Teague et al. | 280/150 AB |
| 3,692,495 | 9/1972 | Schneiter | 23/281 |
| 3,711,115 | 1/1973 | Lohr | 280/150 AB |
| 3,715,131 | 2/1973 | Hurley et al. | 280/150 AB |

*Primary Examiner*—Benjamin R. Padgett
*Attorney, Agent, or Firm*—Bucknam and Archer

[57] ABSTRACT

This invention relates to a method of obtaining the release of a large amount of epurated gas at a moderate temperature in an extremely short time whereby, for example, a safety cushion or bag for automobile vehicles may be very quickly filled, e.g. to protect passengers in the event of a collision. A solid propellant is burned and the gases resulting from its combustion is placed in contact with a vaporisable cooling liquid. This liquid is an oxidizing compound so as simultaneously to cause epuration of the combustion gases by oxidation of the noxious ingredients in these gases into non-harmful products and also cooling of these gases by mixing them with the said liquid and vaporisation of the latter. The invention also provided a gas generator for carrying out this method.

5 Claims, 1 Drawing Figure

PATENTED MAY 13 1975 3,882,673
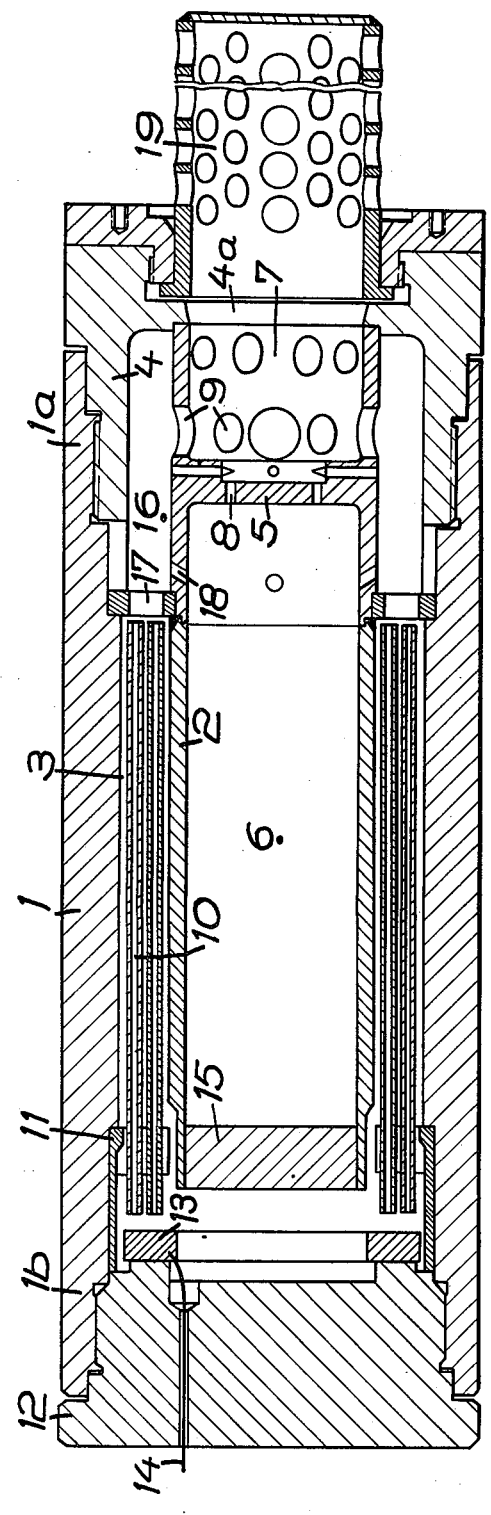

METHOD OF USING LIQUID OXIDANTS TO OBTAIN PURIFIED GASES FROM SOLID PROPELLANTS

The present invention relates to methods of and apparatus for the generation and release of gases, particularly in large quantities.

A known method of rapidly manufacturing a large volume of gas at a moderate temperature consists in cooling the combustion gases of a solid propellant by expansion and mixing them with a vaporisable liquid: for carrying out this operation the apparatus generally adopted has comprised three separate chambers, viz: a combustion chamber for the propellant, a reservoir of vaporisable liquid pressurised by a connection with the combustion chamber, and a mixing chamber to receive the fluid from the combustion chamber and from the liquid reservoir. The flow between the chambers is regulated by suitable nozzles or the like.

The drawback of this method is that the gases produced by combustion of the propellant have a composition which could be extremely harmful by reason of their toxicity (presence of CO, NO, $NO_2$ . . . ), their corrosiveness (presence of Cl, HCl) and their inflammability (presence of CO, $H_2$ . . . ) in the case where these gases have to be evacuated to the atmosphere in an enclosed space such as the interior of an automobile vehicle.

It is an object of the invention to overcome or minimise this drawback and with this and other objects in view consists in a method of obtaining the release of a large amount of epurated gases at a moderate temperature in a very short time, more particularly for the inflation of inflatable articles such as safety cushions for automobile vehicles, which method consists in burning a solid propellant to produce a large volume of combustion gases at a high temperature and pressure, whereupon said gases are contacted at this high temperature and pressure with a vaporisable cooling liquid which is formed by an oxidizing compound in the liquid state or in solution in a vaporisable solvent, so as simultaneously to cause epuration of the said combustion gases by oxidation of the noxious ingredients of these gases into non-harmful products, and cooling of the said gases by admixture with the said liquid and vaporisation of the latter.

In a modification, all the combustion gases are contacted with a part of the vaporisable oxidizing liquid to cause oxidation of the greater part of the noxious ingredients of these gases, then the gases, thus partially epurated, are placed in contact with the remainder of the vaporisable oxidizing liquid in order to achieve cooling of these gases and complete their epuration.

Examples of solid propellant which may be used are double base powders made of hollow strands, or "corrugated cardboard" type powders or lamellar type powders or composite powders (potassium perchlorate-polyurethane), having a short combustion time, the potential of which is higher than 500 calories per gramme and the characteristics of which vary very slightly in dependance upon the initial firing temperature.

The vaporisable oxidizing liquid referred to may be any of the known oxidizing agents capable of transforming, more particularly carbon monoxide, and oxides of nitrogen, into non-noxious products and more particularly water, hydrogen peroxide, aqueous solution of a soluble oxidizing mineral salt, for example aqueous solution of potassium permanganate or potassium nitrate.

The invention also consists in a gas generator for carrying out the method set forth above, and comprising:
a. a reservoir for containing the vaporisable oxidizing liquid,
b. a combustion chamber for containing the solid propellant and its igniting device, and
c. at least one mixing chamber in communication with the said reservoir and said combustion chamber, means being provided for simultaneously introducing the gases produced by combustion of the propellant and the vaporisable oxidizing liquid in said mixing chamber; the upstream part of the latter serving as an oxidizing reaction area and the downstream part serving as a cooling area for these gases.

In a particular embodiment, the generator comprises two mixing chambers arranged in cascade, the first forming a reaction chamber and being in communication with said reservoir and said combustion chamber for receiving all the gases produced by combustion of the propellant and a fraction of the vaporisable oxidizing liquid, the second forming a cooling chamber and being in communication with said reservoir and said reaction chamber for receiving the partially epurated gases issuing from the said reaction chamber with the remainder of the vaporisable liquid.

In order that the invention may be more clearly understood, reference will now be made to the accompanying drawing which shows a sectional view in elevation of a gas generator according to the invention.

Referring now to the drawing, a gas generator according to the invention, particularly for filling safety cushions for automobiles, comprises substantially a cylindrical tubular body 1, within which is mounted a cylindrical tubular member 2 defining with the latter an annular combustion chamber 3 for a solid propellant or fuel.

The tubular body 1 is connected at one end to a threaded annular base 4, the latter being screwed into the threaded end 1a of the body 1. The tubular member 2 is divided by an internal partition 5 into a reservoir 6 for vaporisable oxidizing liquid and a cooling chamber 7. The latter is in communication, on the other hand, with the said reservoir by means of injection nozzles 8 formed in the internal partition 5 for the passage of liquid issuing from this reservoir and, on the other hand, with a reaction chamber 16 through radial orifices 9 provided in the wall of the cooling chamber for passage of the filtered gases issuing from the reaction chamber. The latter is in communication with the combustion chamber 3 through nozzles 17 for passage of the propellant combustion gases from this combustion chamber. The reaction chamber is, moreover, in communication with the reservoir 6 by means of oblique nozzles 18 for the passage of part of the vaporisable oxidizing liquid issuing from this reservoir.

Within the combustion chamber are also located hollow strands 10 of solid propellant mounted on an annular ledge 11 made of plastics material. The free end 1b of the body 1 is closed by a plug 12 carrying an igniter 13 and an electrical priming arrangement 14. The upstream end of the combustion chamber 3 is in communication with the upstream end of the reservoir 6 which is closed by a piston 15 capable of sliding in the reservoir under the action of the gases issuing from the combustion chamber in order to force the liquid from the reservoir back both into the reaction chamber 16 and the cooling chamber 7.

During operation, the igniter 13 is primed and ignites the propellant 10; the gases resulting from combustion of the propellant are at a high temperature and pressure when they enter into contact, in the reaction chamber 16, with a part of the vaporisable oxidizing liquid forced back by the piston 15 from the reservoir 2 into the said reaction chamber, via the nozzles 18 under the action of part of the combustion gases which escape through the upstream end of the combustion chamber. These high temperature and pressure conditions are necessary for the oxidization reaction of the harmful components of the propellant combustion gases by the oxidizing liquid, such a reaction not being able to occur in the mixing chamber of a conventional gas generator where the temperature of the gases is instantly returned to the moderate temperature of use.

The filtered gases thus pass into the cooling chamber 7 where they mix with the remainder of the vaporisable liquid forced back by the piston 15 from the reservoir 2 into the cooling chamber via the injectors 8. Vaporisation of the liquid causes cooling of the filtered gases at a moderate temperature of use in an extremely short time.

The gases thus filtered and cooled are evacuated from the chamber 7 through a diffuser 19 mounted in the bore 4a of the base 4 and are utilised at the outlet of this diffuser.

By way of example, a generator according to the invention was supplied with a propellant comprising 75 g of a double base powder extruded in strands of a potential of 1000 calories per gramme having the following composition:

| | |
|---|---|
| Nitroglycerine | 37 parts by weight |
| Nitrocellulose | 56 parts by weight |
| Stabiliser | 2 parts by weight |
| Ballistic Catalyst | 1 part by weight |
| Various pigments | 4 parts by weight |

The vaporisable oxidizing liquid consisted of 130 grammes of a 5 percent potassium permanganate, aqueous solution the temperature and pressure of the combustion gases in the reaction chamber were 1300°K and 100 bars respectively, and the temperature and pressure of the epurated gases in the cooling chamber were 400°K and 50 bars respectively. These gases contained 15 percent of CO (against 30 percent for the non-epurated combustion gases) and traces of NO (against 5 percent for the non-epurated gases).

At the diffuser 19, 180 of epurated gases were produced at a pressure of 1.3 bar, at a temperature of 70°–100°C in a time of 22 milliseconds, counted from the moment when the electrical priming arrangement 14 was energised.

The inflation of safety cushions for automobile vehicles to the maximum pressure with the aid of such a gas generator necessitates in all, a time of 22 milliseconds approximately.

We claim:

1. A method of obtaining the release of a large amount of purified gases at a moderate temperature in an extremely short time, wherein a solid propellant is burned and the gases resulting from this combustion are placed in contact with a vaporisable cooling liquid, said liquid being an oxidizing compound which is an aqueous solution of hydrogen peroxide, potassium permanganate or potassium nitrate so as simultaneously to oxidize at least a substantial proportion toxic substances present in the combustion gases and cause purification of the said combustion gases by oxidation of the noxious ingredients in these gases into non-harmful products at high temperature and pressure, and cooling of these gases by mixing with the said liquid and vaporisation of the latter.

2. A method according to claim 1, wherein said oxidizing compound is in solution in a vaporisable solvent.

3. A method according to claim 1, wherein all the combustion gases of the propellant are placed in contact with part of the vaporisable oxidizing liquid in order to cause oxidation of the greater part of the noxious ingredients of said gases, then the gases, thus partially purified, are placed in contact with the remainder of the vaporisable oxidizing liquid in order to obtain cooling of said gases and complete their epuration.

4. A method according to claim 1, wherein said solid propellant is a powder selected from the group comprising double base powders in the form of hollow strands, "corrugated cardboard" type powders, "lamellar" type powders, and composite powders having short combustion time, the potential of said powders being greater than 500 calories per gramme and the characteristics of said powders varying very slightly in dependance upon the initial ignition temperature.

5. A method according to claim 1 wherein a solid propellant is burned to produce a large volume of combustion gases at a high temperature and pressure, and said gases are placed in contact at said high temperature and pressure with at least part of said oxidizing compound in order to cause oxidation of the noxious ingredients of said gases, then the gases thus purified are expanded and placed in contact with the remainder of the oxidizing compound in order to obtain cooling of said gases.

* * * * *